United States Patent [19]
Mizuki et al.

[11] Patent Number: 5,838,828
[45] Date of Patent: Nov. 17, 1998

[54] METHOD AND APPARATUS FOR MOTION ESTIMATION IN A VIDEO SIGNAL

[75] Inventors: Marcelo M. Mizuki, Coral Springs, Fla.; Ichiro Masaki, Action, Mass.; Anantha Chandrakasan, Belmont, Mass.; Berthold Horn, Carlisle, Mass.

[73] Assignee: Massachusetts Institute of Technology, Cambridge, Mass.

[21] Appl. No.: 570,889

[22] Filed: Dec. 12, 1995

[51] Int. Cl.$^6$ .............................. G06K 9/36; G06K 9/46
[52] U.S. Cl. .................... 382/236; 348/154; 348/700; 382/107
[58] Field of Search .................................. 382/106, 107, 382/236, 199, 200, 218, 222, 27; 348/154, 155, 407, 413, 431

[56] References Cited

U.S. PATENT DOCUMENTS

| | | | |
|---|---|---|---|
| 4,987,357 | 1/1991 | Masaki | 318/587 |
| 5,008,745 | 4/1991 | Willoughby | 348/155 |
| 5,027,422 | 6/1991 | Peregrim et al. | 382/294 |
| 5,140,538 | 8/1992 | Bass et al. | 364/602 |
| 5,150,426 | 9/1992 | Banh et al. | 382/103 |
| 5,212,547 | 5/1993 | Otsuki | 348/154 |
| 5,387,947 | 2/1995 | Shin | 348/699 |
| 5,396,284 | 3/1995 | Freeman | 348/155 |
| 5,469,517 | 11/1995 | Ohta | 382/252 |
| 5,530,483 | 6/1996 | Cooper et al. | 348/518 |
| 5,581,308 | 12/1996 | Lee | 348/407 |
| 5,586,202 | 12/1996 | Ohki et al. | 382/236 |
| 5,594,813 | 1/1997 | Fandrianto et al. | 382/236 |

OTHER PUBLICATIONS

"Motion Estimation Processor" SGS–Thomson Microelectronics St13220, Jul. 1992, pp. 97–121.

"Array Architectures for Block Matching Algorithms" Thomas Komarek and Peter Pirsch, IEEE Transactions on Circutis and Systems, vol. 36. No. 10, Oct. 1989, pp. 1301–1308.

Contour Based Representation of the Displacement Field for Motion Compensated Image Coding, Stefan Carlsson and Christian Reillo, IEEE, pp. 161–164.

"Industrial Vision Systems Based on Application–Specific IC Chips" IEICE Transactions, Ichiro Masaki, pp. 1728–1734.

"Algorithms and VLSI Architectures for Motion Estimation" VLSI Implementations for Image Communications 1993, pp. 251–282.

"A Binary Block Matching Architecture with Reduced Power Consumption and Silicon Area Requirement" Marcelo M. Mizuki, Ichiro Masaki, Anantha Chandrakasan, Berthold Horn, Charlie Sodini, 9 pages.

"Computing 3–D Motion in Custom Analog and Digital VLSI" Lisa Dron, MIT Artificial Intelligence Laboratory, Technical Report 1498, Aug. 1994, pp. 1–309.

*Primary Examiner*—Joseph Mancuso
*Assistant Examiner*—Jayanti K. Patel
*Attorney, Agent, or Firm*—Christopher S. Daly; Nutter, McClennen & Fish LLP

[57] ABSTRACT

A method and apparatus for motion estimation in a video signal includes an edge detector for generating present and reference binary edge bit maps and a binary block matcher for receiving the present and reference binary edge bit maps from the edge detector and for generating a motion vector for each of a plurality of blocks in the binary edge bit maps. By using binary edge bit map data to generate motion vectors, computational requirements are reduced. If the apparatus is provided as an integrated circuit, the technique of the present invention reduces cost, power requirements and size of the integrated circuit.

20 Claims, 12 Drawing Sheets

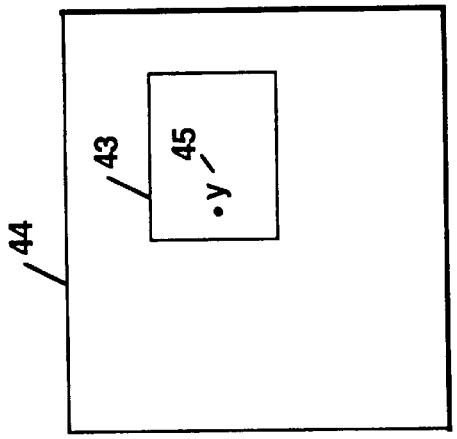
*Figure 2B*
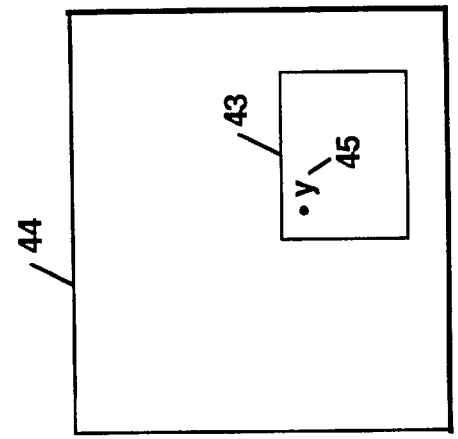
*Figure 2D*
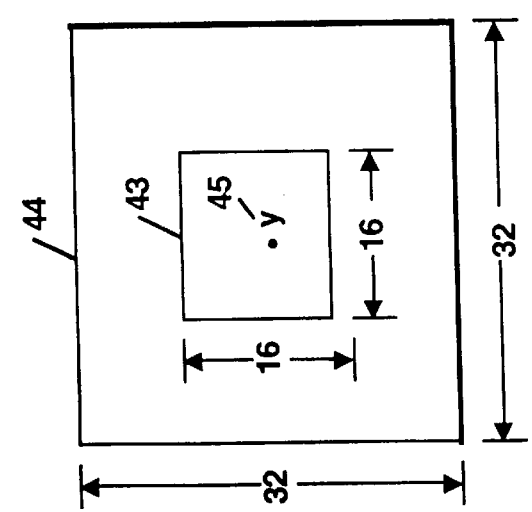
*Figure 2A*
*Figure 2C*

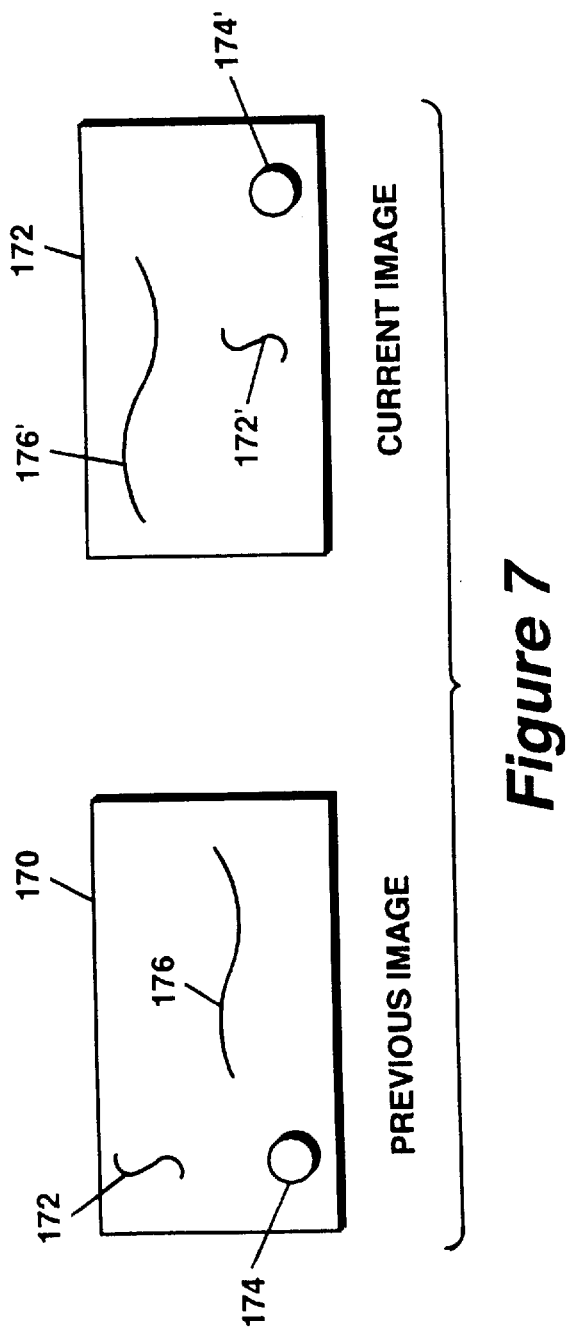

METHOD AND APPARATUS FOR MOTION ESTIMATION IN A VIDEO SIGNAL

FIELD OF THE INVENTION

This invention relates to signal processing techniques and more particularly to a method and apparatus for estimating displacement of moving objects in a video signal.

BACKGROUND OF THE INVENTION

As is known in the art, motion estimation refers to the process of obtaining a displacement of pixels or blocks of pixels in a sequence of video image frames. Frame-to-frame changes in luminance are generated when objects move in video sequences. Such luminance changes can be used to estimate the displacement of moving objects in image frames.

One standard for video coding set forth by the Motion Picture Experts Group (MPEG), specifies the use of a block matching technique for motion estimation. Block matching involves partitioning a present video image frame into an array of M×N blocks.

For each block in the present video image frame, there is a corresponding search window in a previous or reference video image frame. The search window size is determined by the size of the present block and its maximum expected displacement in horizontal and vertical directions from a predetermined location in the reference video image frame. If both the horizontal and vertical displacements are assumed to be in the range [−p, p], the search window then contains (M+2p)×(N+2p) pixels. The block in the image frame. If both the horizontal and vertical displacements are assumed to be in the range [−p, p], the search window then contains (M+2p)×(N+2p) pixels. The block in the present frame is matched to a candidate block in the search window according to some distortion criterion.

Typically, such distortion criteria is related to the difference in pixel intensity values between the pixels in the block of the present frame and the pixels in the candidate block in the search window. Pixel intensity values are typically provided as eight bit values. One commonly used distortion criterion which relies on pixel intensity is the so-called Mean-Absolute Difference (MAD) criterion. In the MAD approach, the absolute value of the difference in luminance values of each pixel in the block of the present frame and each pixel in a candidate block in the search window is computed. The absolute difference values are summed and the candidate block which resulted in the lowest sum is used to produce the motion vector.

For example, letting the upper left hand corner of a block in a present image frame be the origin of a coordinate system (e.g. point (0,0) in an X-Y coordinate system), the distortion value D for the candidate block at position (m,n) in the search window may be computed as:

$$D(m,n) = \sum_{i,j} |x(i,j) - y(l+m, j+n)|$$

in which:
- x(i,j) corresponds to a pixel intensity value at location i,j in present image block; and
- y(l+m, j+n) corresponds to the pixel intensity values at locations l+m, j+n in the candidate image block.

The motion displacement between the present block and the selected candidate block which results in the minimum distortion value determines the motion vector v for the present block. Thus, the motion vector v may be provided as:

$$v = [m,n]|^{D_{min}}$$

in which:
- [m,n] represents the coordinates of the candidate block at which the distortion value is a minimum One problem with this block matching technique, however, is the relatively high computational requirements. For example, if the maximum expected block displacement is confined to the range [−p, +p] in both horizontal and vertical directions about the present image block, then there are $(2p+1)^2$ candidate blocks in the search window. The number of operations per candidate block position is equal to 3×M×N, where the factor of 3 arises if it is assumed that subtraction, absolute value, and addition each count as one operation. For an image frame having H horizontal pixel rows and V vertical pixel rows, the number of blocks in the image frame thus corresponds to H×V/M×N, and the total number of operations per second (OPS) for a frame rate F may be computed as:

$$OPS = 3 \times H \times V \times (2p+1)^2 \times F$$

Assuming video image frames may be defined as an array of 512×512 pixels and further assuming that p=8, and that the frame rate F corresponds to 30 frames per second, the number of operations per second which must be computed is 6.8 giga operations per second. Thus, the block matching approach is computationally intensive.

Due to deal the computationally intensive nature of the block matching technique specialized very large scale integrated circuits (VLSI) and techniques to reduce the number of pixel-level distortion operations are typically used. Specialized integrated circuits, however, are relatively complicated and thus relatively expensive to manufacture and techniques to reduce the number of pixel-level distortion operations such as selective search methods in which only selected points in a search window are used tend to reduce the effectiveness of the block matching approach.

It would, therefore, be desirable to provide a method and apparatus for estimating the displacement of moving objects in a video signal which is not computationally intensive and which may be implemented in a relatively low cost integrated circuit which is relatively easy to manufacture.

SUMMARY OF THE INVENTION

In accordance with the present invention, an apparatus for estimating the motion of moving objects between a present image frame and a reference image frame includes an edge detector for receiving the present image frame at a first input port, the reference image frame at a second input port and for providing at a first output port a present image binary edge bit map and for providing at the second output port a reference image binary edge bit map. The apparatus further includes a binary block matcher coupled to the edge detector, the binary block matcher for receiving the present and reference image binary edge bit maps, each of the present and reference image binary edge maps having a like plurality of blocks, the binary block matcher for comparing each of the plurality of blocks of the present image binary edge bit map with each of the plurality of blocks of the reference image binary edge bit map and for generating a motion vector for each of the plurality of blocks of the present image binary edge map. With this particular arrangement, a binary block matching circuit is provided. The binary block matching circuit compares edges stored in binary edge bit maps to compute a motion vector. By extracting edge data from an image frame and storing the edge data as single bit values in a binary edge bit map, the single bit edge values may be compared to compute a distortion value. This is in contrast to conventional block matching techniques in which eight-bit pixel intensity values between blocks in a present image frame and a reference image frame are compared to compute a motion vector. If the apparatus is provided as an integrated circuit, comparison of single bit values leads to significant savings in computation time and integrated circuit complexity, size, cost and power requirements. Potential applications of such an integrated circuit include but are not limited to low power, portable video devices and machine vision applications such as stereo vision matching and template matching.

In accordance with a further aspect of the present invention a processing element includes a first register for receiving a reference image signal, a second register for receiving a present image signal, a third register for holding the present image signal fed thereto from the second register, a current signal source having an output port coupled to an output port of the processing element and means, having a first input port coupled to output port of the first, a second input port third registers and having an output port coupled to the current source, the means for providing a current signal at the output port of the processing element in response to a first one of the signals from the first or third registers having a predetermined value. With this particular arrangement, a processing element for use in a binary block matcher is provided. An array of such processing elements may be coupled together to provide a processing element array. Each processing element in such a processing element array operates on a single bit from each of a present image frame and a reference image frame and generates a motion vector from the single bit values.

In accordance with a still further aspect of the invention, a method of estimating motion of a moving object in a scene includes the steps of (a) generating an edge bit map for each of a reference image frame and a present image frame (b) segmenting the reference image frame into a plurality of blocks, each of the blocks including the same number of pixels, (c) segmenting the present image frame into a plurality of blocks, each of the blocks having including the same number of pixels, (d) specifying the size of a search window area in the present frame (e) changing the relative position between a block of the present image frame and each of the plurality of blocks of the reference image frame within the search window area (f) computing a distortion value for each relative position of the block of the present image frame and the plurality of blocks of the reference image frame within the search window area and (g) providing a motion vector for each block of the present image frame. With this particular technique, a computationally efficient motion estimating method is provided. By performing edge detection on both a present image frame and a reference image frame and generating present and reference image frame binary edge bit maps a correlation between edges in blocks of the binary edge bit maps may be used to perform matching. The distortion criterion becomes:

$$D(m,n) = \sum_{i,j} x(i,j) \oplus y(l+m, j+n)$$

in which:

x(i,j) and y(i,j) are binary edge maps; and $\oplus$ corresponds to an exclusive or (XOR) logic operation. Minimizing the distortion value is equivalent to maximizing the correlation. The method may further include the step of validating a distortion value. Since many images include smooth regions that do not contain significant intensity variation, the binary edge bit maps in these smooth regions include very few edges and consequently, the motion vectors obtained using an edge correlation criterion may not be very reliable. In cases where the sum of contour pixels in a block is less than some edge threshold value, the motion vectors should be rejected. This validation step increases the robustness of the method. When a given block does not pass the validation test, there are a essentially two options. A first option is to set the motion vectors of that particular block to zero and to only transmit error information. One problem with this approach, however, is that it could result in a significant increase in the data rate. A second option is to interpolate the motion vectors of adjacent blocks to obtain the motion vectors of the block that did not pass the validation. A linear interpolation process using the horizontal motion vectors of adjacent horizontal blocks may be used to compute the horizontal motion vector Mvx. Likewise, vertical motion vectors of adjacent vertical blocks may be used to compute the vertical motion vector Mvy.

BRIEF DESCRIPTION OF THE DRAWINGS

The foregoing features of the invention, as well as the invention itself may be more fully understood from the following detailed description of the drawings, in which:

FIGS. 2A–2D are a series of diagrams illustrating movement of a search window;

FIG. 7 illustrates correlation between a present image and reference image without dividing the images into blocks.

DESCRIPTION OF THE PREFERRED EMBODIMENTS

Before describing the operations performed to generate a motion vector, some introductory concepts and terminology are explained.

An analog or continuous image sequence such as a scene of a moving roller-coaster, for example, may be converted to a digital video signal as is generally known. The digital video signal is provided from a sequence of discrete digital images, or frames. Each frame may be represented as a matrix of digital data values which may be stored in a storage device of a computer or other digital processing device. Thus, as described herein, the matrix of digital data values are generally referred to as an "image frame" or more simply an "image" or a "frame" and may be stored in a digital data storage device, such as a memory for example, as an array of numbers representing the spatial distribution of energy in a scene.

Each of the numbers in the array may correspond to a digital word (e.g. be represented as an eight-bit value) and be referred to as a "picture element" or a "pixel" or as "image data." The value of each digital word corresponds to the intensity of the pixel and thus the image at that particular pixel location. Thus, a pixel represents a single sample which is located at specific spatial coordinates in the image. The image frame may be divided into a two dimensional array of pixels with each of the pixels represented by a digital word.

A present image is one which is represented by a recent image frame in a sequence of image frames. A reference image is an image frame which occurred in a sequence of image frames prior to the present image. The reference image frame may be one frame or several frames prior to the present frame in the frame sequence. As described herein, reference is sometimes made to an array which holds the image frame and which is taken to be 512×512. One of ordinary skill in the art will of course recognize that the techniques described herein are applicable to various sizes and shapes of pixel arrays including irregularly shaped pixel arrays. Reference is also sometimes made herein to a digital video signal having a rate of 30 frames per second. One of ordinary skill in the art will of course recognize that the techniques described herein are applicable to various frame rates which may be greater or less than 30 frames per second.

The image is provided having an image boundary or more simply a boundary. The image boundary defines outside edges of an image beyond which no image data for that frame exists. An image also typically includes scenes having edges. In some cases an image will be divided into a plurality of image regions or sections referred to as "image blocks" or more simple "blocks."

Figure 1:
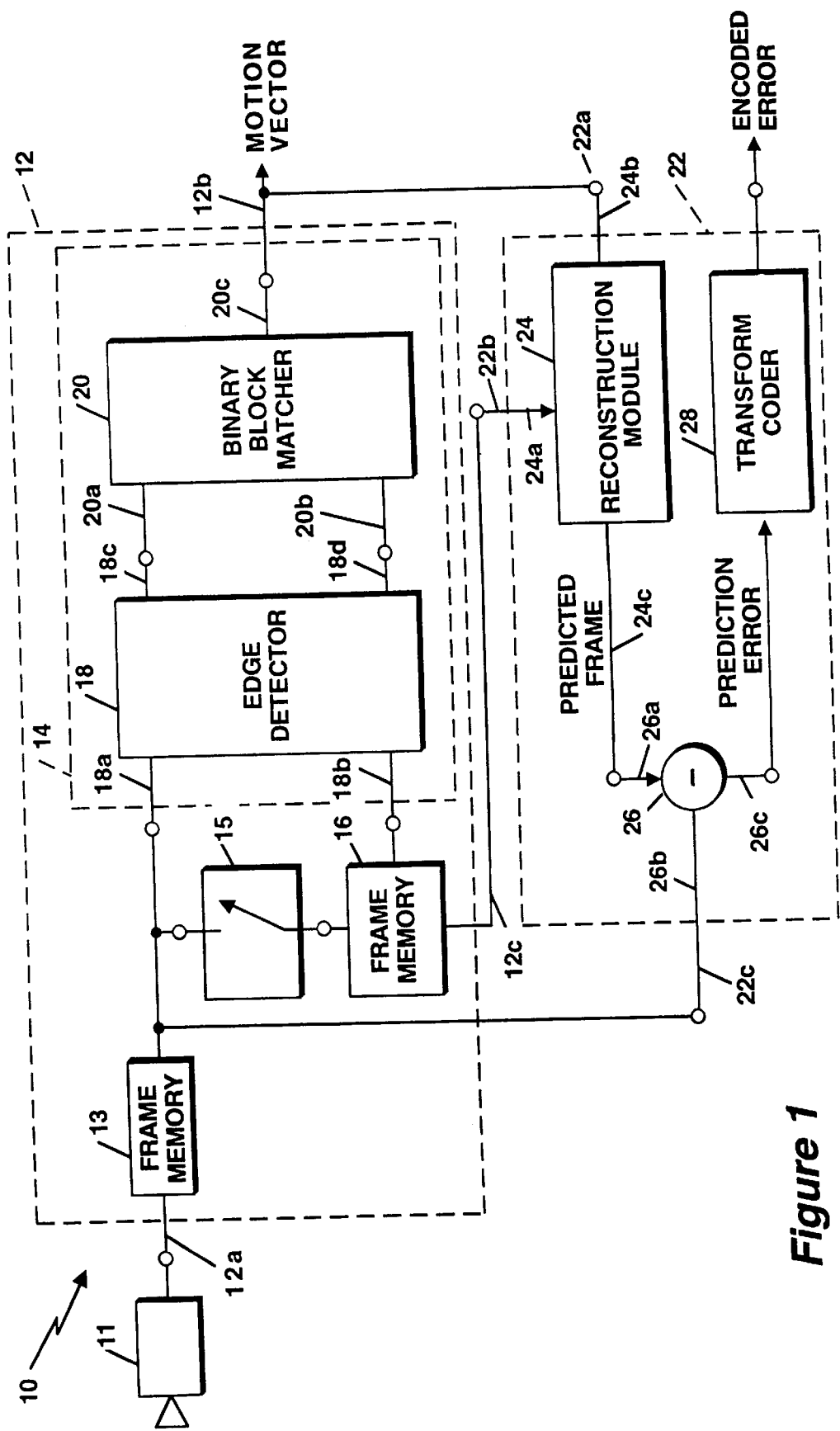
FIG. 1 is a block diagram of an motion estimation circuit.

Referring now to FIG. 1, an apparatus 10 for estimating the motion of objects between a present image frame and a reference image frame includes a scanning system 11 which may for example be provided as a camera. Scanning system 11 provides a video signal to an input port 12a of a motion detector 12. The video signal is provided as a sequence of image frames that are generated by scanning system 11. Scanning system 11 captures new image frames at periodic intervals of time to thus provide the sequence of image frames. The video signal may, for example, be provided to input port 12a of motion detector 12 at a rate of approximately 30 frames per second.

Frames provided at input port 12a are stored in a frame memory 13. An output port of frame memory 13 is coupled through a switch 15 to an input port of a second frame memory 16. Switch 15 closes when it is desired to move a frame from frame memory 13 to frame memory 16.

Figure 1A:
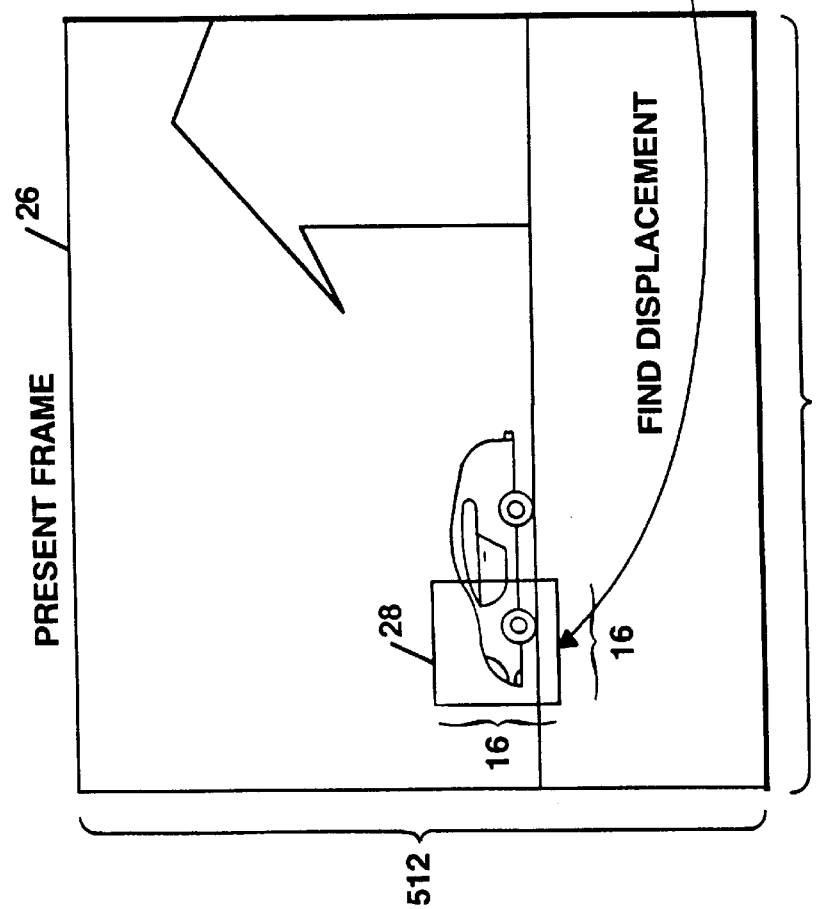
FIG. 1A is a series of frames to be analyzed by a motion estimation circuit.

Referring briefly to FIG. 1A, two frames 26, 27 of a sequence of frames are shown. Frame 26 corresponds to a present frame which may for example be stored in frame memory 13 (FIG. 1) while frame 27 corresponds to a reference frame which may be stored in frame memory 16 (FIG. 1). The scene represented in reference frame 27 and stored in frame memory 16 occurred earlier in time than the scene represented by the present frame 26 and stored in frame memory 13. That is, frame 26 occurs later in the sequence of frames than does frame 27. Thus, the image stored in frame memory 13 is closer to the present time (and hence is referred to as a "present frame") than the reference image frame stored in frame memory 16.

The present and reference frames 26, 27 may be adjacent frames of the sequence of frames which provide the video signal or alternatively the present frame 26 and reference frame 27 may have several frames interceding between them. Motion detector 12 detects the motion of moving objects in the two frames 26, 27 by dividing frames 26, 27 into a plurality of blocks of predetermined size. For example, assuming frame 27 is represented by a pixel array having 512 columns and 512 rows (i.e. a 512×512 pixel array) then motion detector 12 may divide the frame into a predetermined number of rows and columns to provide an array of blocks. For example, the frame may be divided into 32 rows and 32 columns to provide 1024 blocks each having an array size of 16×16. For simplicity, in FIG. 1A only a single block 28 is shown.

Referring again to FIG. 1, the output port of frame memory 13 is coupled to an edge detector 18 at an input port 18a. A second input port 18b of edge detector 18 is coupled to the output port of frame memory 16. Thus edge detector 18 receives the present and reference image frames images from frame memories 13 and 16 respectively.

Edge detector 18 identifies each of the edges in the present and reference frames fed thereto from frame memories 13, 16 respectively. Edge detector 18 provides at a first output 18c a present image binary edge bit map and provides at a second output port 18d a reference image binary edge bit map. Edge detector 18 may provide such binary edge bit maps using any of the techniques well known to those of ordinary skill in the art including but not limited to the Sobel edge detection technique.

The first output port 18c of edge detector 18 is coupled to a first input port 20a of a binary block matching circuit 20. Similarly, the second output port 18d of edge detector 18 is coupled to a second input port 20b of binary block matching circuit 20. Since edge detector 18 provides binary edge bit maps for each of a present frame and a reference frame, each pixel in block 28 (FIG. 1A) is represented as a single bit.

Binary block matching circuit 20 receives the present and reference image binary edge bit maps, compares the two binary edge bit maps to each other and provides an output motion vector at an output port 20c which is coupled to output port 12b of motion detector circuit 12. Thus binary block matching circuit finds the pixel displacement between block 28 and block 28?? (FIG. 1A).

A motion vector is thus provided at an output port 12b of motion estimating apparatus 10. Output port 12b may be subsequently coupled to a transmission channel for further processing. Output port 12b is also coupled to an input port 22a of an error correction circuit 22. Also provided to error correction circuit 22 at input ports 22b and 22c respectively are a present image frame and reference image frame.

Error correction circuit 22 includes a reconstruction module 24 which receives the reference image frame from frame memory 16 at input port 24a, receives at input port 24b the motion vector from output port 12b of motion detector 12 and provides a predicted image frame at an output port 24c. A subtractor circuit 26 has a first input port 26a coupled to reconstruction module output port 24c and a second input port 26b coupled to output port 22c of error correction circuit 22. Subtractor circuit 26 thus receives a predicted frame at input port 26a, a present frame at input port 26b and provides a predicted error signal at a third output port 26c.

The predicted error signal is provided to a transform coder 28 which encodes the predicted error signal and provides an encoded error signal at an output port 22d of error correction circuit 22. Output port 22d may be coupled to a transmission medium as is generally known.

Figure 2:
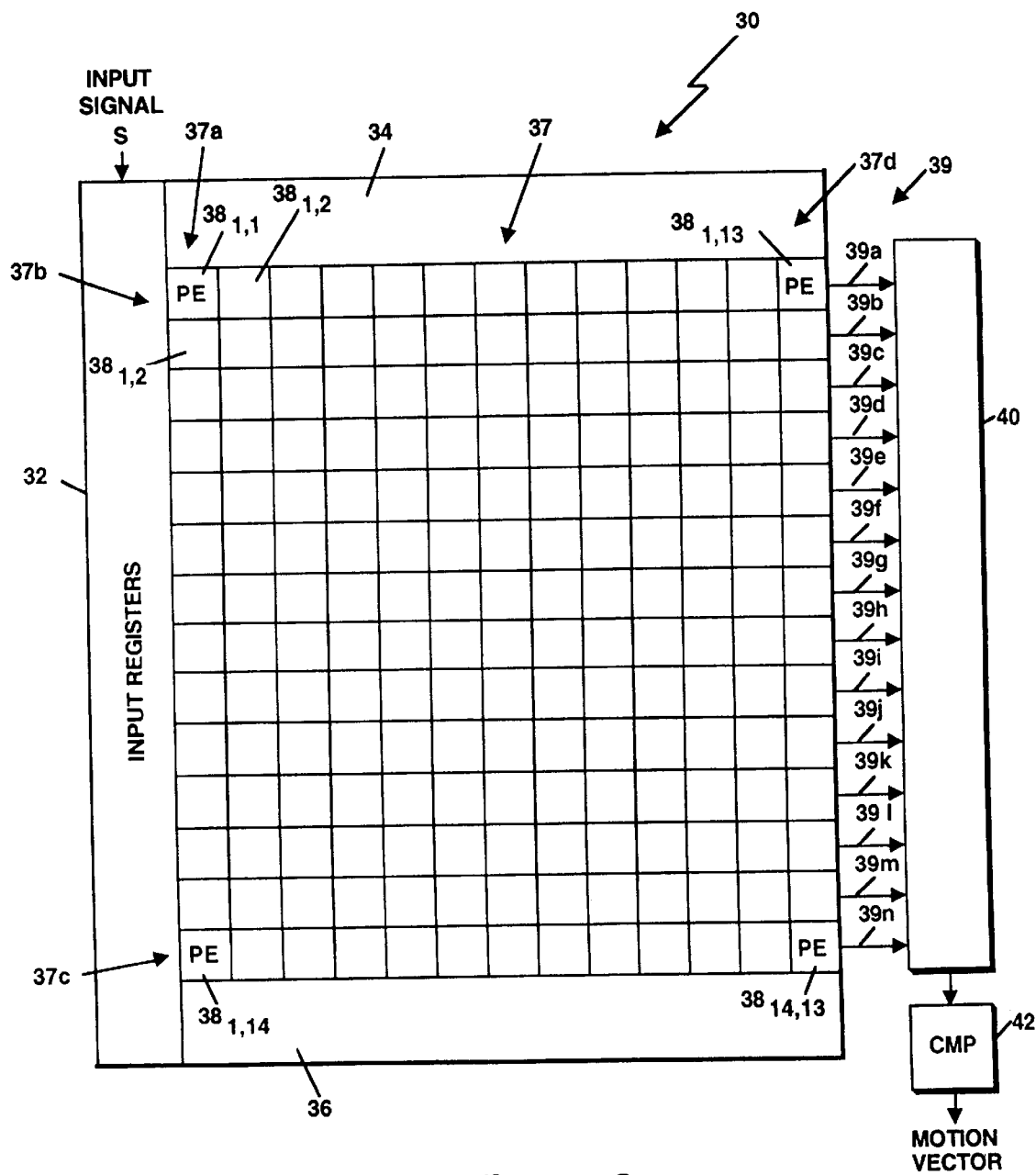
FIG. 2 is a block diagram of a processing array architecture.

Referring now to FIG. 2, a binary block matching circuit 30 includes a processing element array 37 having a plurality of processing elements generally denoted 38. Each processing element has an x and y position in the processing element array 37. Thus a particular processing element 38 in the processing element array 37 may be identified by two identifiers. For example, processing element $38_{ij}$ identifies the processing element in the processing element array having that x, y position in the array 37.

First ones of a plurality of input registers 32 are coupled to a first column 37a of processing element array 37, while a predetermined number of input registers 32 extend past upper and lower rows 37b, 37c of processing element array 37. A plurality of upper side registers 34 are coupled to row 37b of processing element array 37 and a plurality of lower side registers 36 are coupled to row 37c of processing element array 37.

Registers 34, 36 are selected to have a size which allows a search window to be shifted to a predetermined region of the processing element array 37 thereby reducing the need for memory accesses. Thus registers 34, 36 allow storage of the entire range of search window pixels.

Each row of processing element array 37 provides a partial correlation signal at respective ones of output ports 39a–39n generally denoted 39. Each of the output ports 39 are coupled to a corresponding input port of an adder tree 40 to thereby feed the partial correlation signals to adder tree 40. Adder tree 40 sums the partial correlation signals and feeds a total correlation value to a comparator 42. Comparator 42 compares the difference between distortion values during each clock cycle. Thus processing element array 37 performs sequential comparisons of distortion values during each clock cycle.

Processing elements 38 will be discussed in more detail further below in conjunction with FIGS. 3 and 4. Suffice it here to say, however, that each processing element 38 includes at least two shift registers in which block data from binary edge bit maps may be stored. The use of shift registers 32, 34, 36, as well as the registers in processing elements 38 lowers the number of required memory accesses to retrieve pixel data since pixels stored in the registers can be used more than once during processing. Thus, since each search window pixel is used several times in the computation of the distortions, the architecture of the present invention reduces the number of memory access required to generate a motion vector.

Each processing element 38 computes a portion of a motion vector. Thus each processing element is dedicated to one pixel pair (i.e. one pixel in a block from a present image frame and one pixel in a block from a reference image frame). A distortions signal and corresponding motion vector is computed from the pixel pair. With this approach, distortion comparisons can be done while the block data is being shifted into the processing element array 37.

For processing element array 37 to compute one motion vector during each clock cycle, each processing element 38 operates on a first data bit from a block of a pixel array in the present image frame and a second data bit from a block of a pixel array in the reference image frame. For example, assume that an image frame is represented by a pixel array having 512 rows and 512 columns. If the pixel array is divided into 32 blocks along each row and 32 blocks along each column then each block would include a pixel array which is of order 16×16. Thus, the block would be represented by a processing element array which is of order 16×16. It should be noted, however, that through the use of shifting and storing block data values, a 16×16 processing element array may be able to process a block defined by a pixel array 37 which is of order 32×32.

Furthermore, when binary block matcher is provided as an integrated circuit, such an integrated circuit may be manufactured using mixed analog and digital technologies thereby allowing the size of the integrated circuit to be reduced and thus providing cost advantages.

During an initialization cycle, on each clock cycle block data from a binary edge bit map is serially shifted into input registers 32 at an input port 32a. Once a row of data from the binary edge bit map is loaded into registers 32, registers 32 perform a parallel transfer to transfer the data stored therein to the processing elements in column 37a of processing element array 37.

FIGS. 2A–2D illustrates how a present window block 43 from a present frame is shifted about a search window 44. Pixel 45 is used in the computations of several candidate distortion positions. Here the present window block is taken to be a 16×16 pixel array and the search window 44 is taken to be a 32×32 array.

Referring again to FIG. 2, each processing element 38 in processing element array 37 and shift registers 32, 34, 36 in the array contain 3-way registers that are capable of shifting data up, down, and right. It should be noted, however, that processing elements in row 37b of processing element array 37 need not be able to shift data up and thus may have 2-way registers to thus be able to shift data down and to the right. Similarly, processing elements in row 37c need not be able to shift data down and thus may have 2-way registers to thus be able to shift data up and to the right. Similarly, processing elements 38 in the column 37d need not be able to shift data to processing elements to the right thereof since no processing elements exist to the right thereof.

During the initialization cycle, a bit from each block in a present image binary edge bit map is shifted into each of the processing elements 38. The manner in which processing elements 38 receive the bit will be described in detail below in conjunction with FIG. 4. Suffice it here to say that because each of the processing elements 38 will hold one present block position the number of processing elements in the array 37 must be sufficient to hold each pixel in the block.

During a computation phase, the search window pixels are shifted into the array 37. Each processing element 38 computes the absolute value of the difference between the search window pixel shifting through the processing element 38 and the present block pixel stored in the processing element 38. This absolute value of the difference is added to the partial sums of the absolute value of the differences obtained from the processing elements 38 to the left and the resulting sum is shifted to the right.

The first distortion values will be available when all the columns of processing elements 38 and upper side registers 34 contain a search window pixel. The partial sum of the distortion values from all the rows of the processing elements 38 are added in the adder tree 40 as shown. Adder tree 40 provides at an output port thereof a distortion value for one candidate block.

Figure 2E:
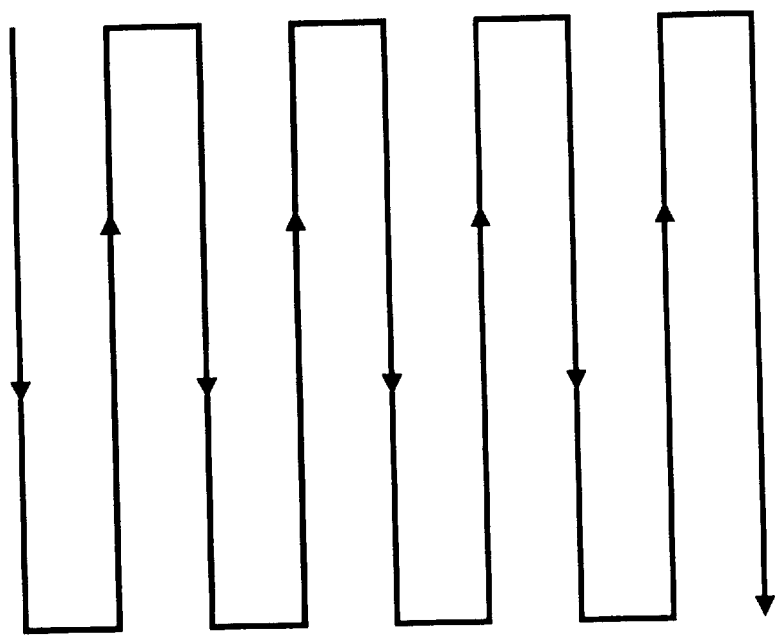
FIG. 2E is a diagram illustrating the direction in which information is loaded into a processing element array.

To compute the distortion for the next candidate block, the search window data in the processing elements 38 and shift registers 32, 34, 36 are shifted down and the resultant partial sums are obtained in the adder tree 40. The data are shifted down for the first N−1 computational cycles until the lower side registers 36 are filled. At that point, all the processing elements 38 and registers 32, 34, 36 shift their search window data to the right. The distortion values for that position are computed and then the pixels are shifted up for the next N−1 cycles. The data flow for a search window pixel is illustrated in FIG. 2E.

To provide a binary block matching architecture, each processing element 38 is provided having a logic circuit which implements an exclusive-or logic function. As will be described below in conjunction with FIG. 4, the exclusive-or logic function could be provided, for example from an exclusive-or logic gate. A reduction in the number of computations required for binary block matching technique of the present invention arises from the fact that the processing elements 38 operate on binary data instead of eight-bit gray scale data.

Figure 3:
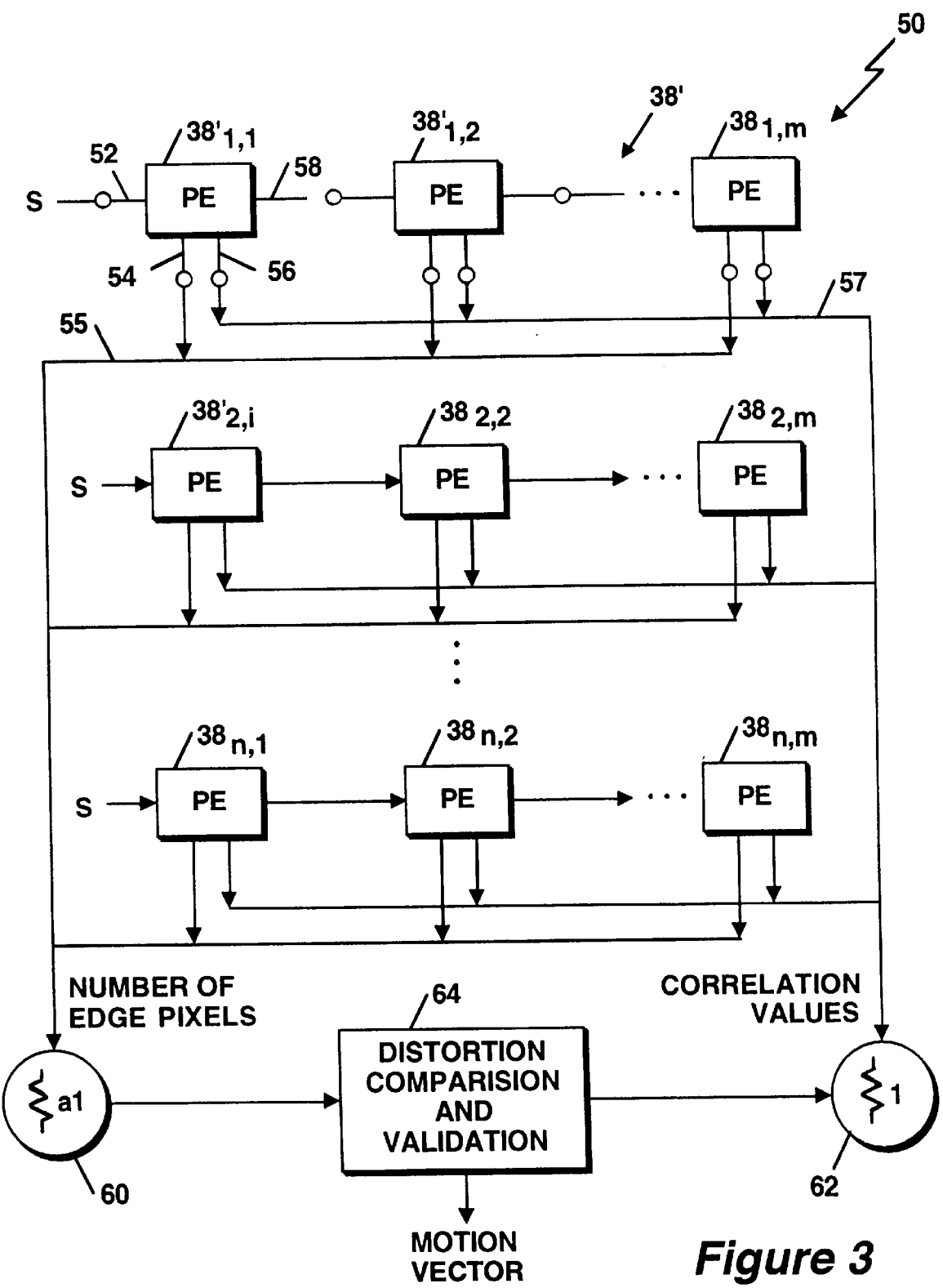
FIG. 3 is a block diagram of a processing array architecture.

Referring now to FIG. 3, a motion detecting apparatus 50 includes a plurality of processing elements $38'_{1,1}$–$38'_{n,m}$ generally denoted 38'. Processing elements $38'_{1,1}$–$38'_{1,m}$ are coupled to provide a row of processing elements. Search window data is shifted into the first processing element of the row at an input port 52.

Taking processing element $38'_{1,1}$ as representative of each of the processing elements 38', the processing element $38'_{1,1}$ includes first and second output ports 54 and 56. Output port 54 is coupled through a first signal path 55 to a current-to-voltage converter 60. Processing element $38'_{1,1}$ provides an output signal on port 54 if the processing element $38'_{1,1}$ detects an edge.

Processing element port 56 is coupled through a signal path 57 to a current-to-voltage converter 62. Processing element $38'_{1,1}$ provides an output signal at port 56 which corresponds to a partial distortion value. The distortion is thus represented as an analog current signal.

Distortion current signals are summed across each of the rows of processing elements 38' and summed to provide a correlation value at an input port of the character voltage converter 62. A voltage is thus provided from current-to-voltage converter 62 to an input port of a distortion comparison and validation circuit 64.

Similarly, current signals which represent the number of edges in a block are summed across each of the rows into current-to-voltage converter 60. Current-to-voltage converter 60 thus provides a voltage signal to validation circuit 64. If the number of edges in a window exceeds a predetermined edge threshold value then the correlation value of that window is accepted, otherwise the correlation value for that window is ignored.

A logic circuit, which may for example be provided as the type which implements an exclusive-or logic function, is used in each processing element 38' to turn on a current source whenever the binary values for the reference block and the search window block are different. The sum of the distortions is computed by summing the current signals which are provided by the current sources at output ports 56 of the processing elements 38'. The current signal is fed to a current-to-voltage converter 62 which converts the current signal fed thereto to a voltage signal and provides the voltage signal at an output port thereof. The voltage signal is fed a distortion comparison and validation circuit which validates and locates the candidate block offset with the minimum distortion (maximum correlation).

Figure 4:
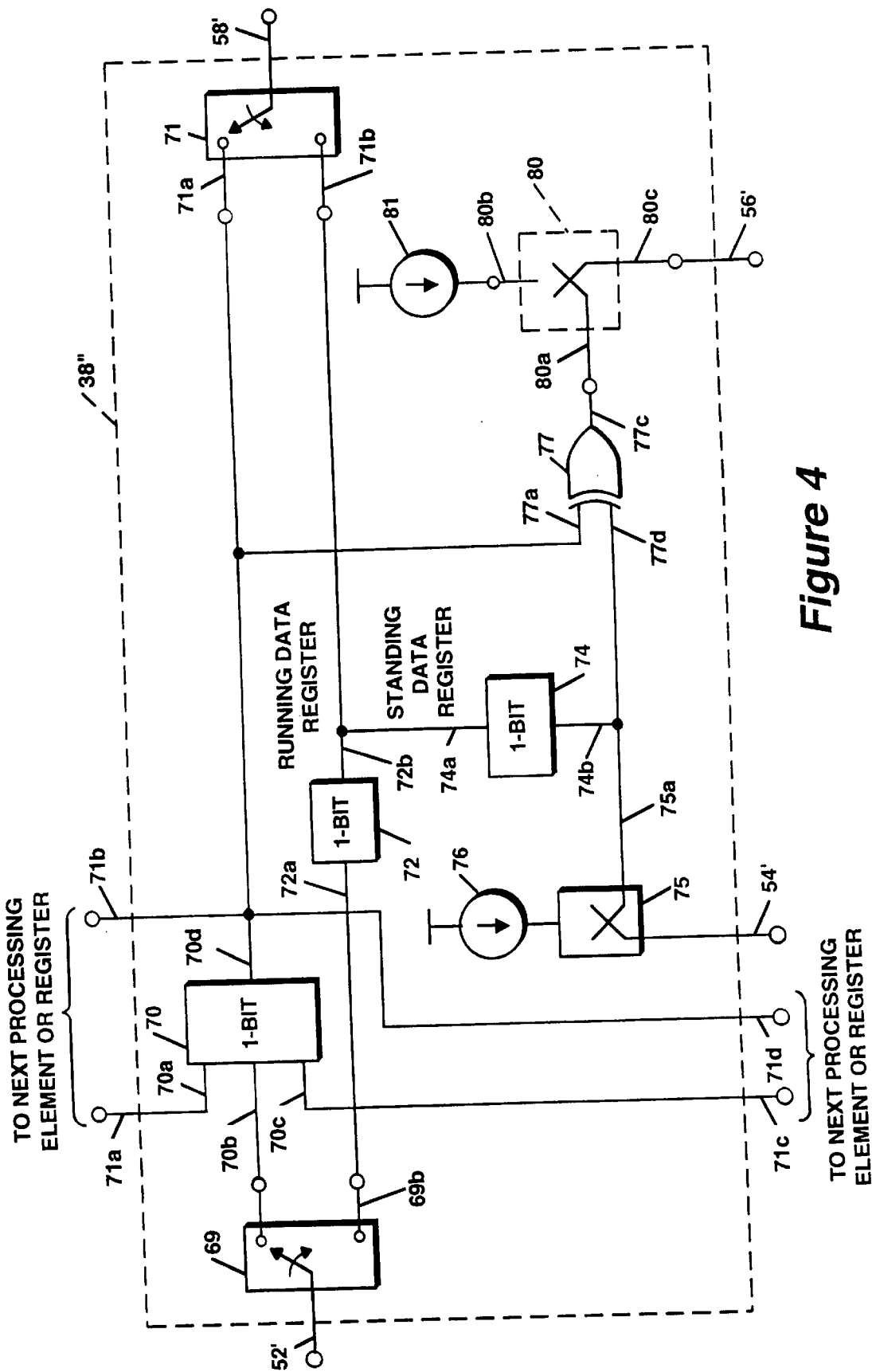
FIG. 4 is a schematic diagram of a processing element.

Referring now to FIG. 4, a processing element 38" has a first input port 52' and a plurality of output ports 54'–58'. Processing element 38' receives search window data on input port 52'. During an initial program mode a switch 69 is coupled in a first position such that a single bit is fit into a single bit register 70. An output port 70d of register 70 is coupled to a switch 71 at a first input 71a.

It should also be noted that output port 70d can be coupled to other processing elements via terminals 71b, 71d. Thus data can be shifted up or down to processing elements coupled to terminals 71b, 71d of processing element 38". Similarly, processing element 38" can receive data on terminals 71a, 71c. Such data may be shifted to processing element 38" from adjacent processing elements for example.

When switch 69 is in a second different position, an input signal presented at input port 52' is coupled to output port 69b and subsequently to a first input port 72a of a single bit register 72. An output port 72b of register 72 is coupled to switch 71 at a second input port 71b. Output port 72b of switch 72 is also coupled to a first input port 74a of a standing data register 74. Output port 74b of register 74 is coupled to a control terminal 75a of a switch 75. Switch 75 is coupled between a current source 76 and output port 54'.

To provide a binary block matching architecture, each processing element 38 is provided having a 1-bit XOR gate. Thus, processing element 38" includes a logic circuit 77 which implements an exclusive or logic function (X-OR). A first input port 77a of logic circuit 77 is coupled to output port 70d of register 70 and a second input port 77b of logic circuit 77 is coupled to output port 74b of standing data register 74. An output terminal 77c of logic circuit 77 is coupled to a switch 80 at a control terminal 80a. An input port 80b of switch 80 is coupled to an output port of a current source 81 and an output port of switch 80c is coupled to output terminal 56' of processing element 38".

During an initialization cycle of processing element 38", a bit from a block of the present image binary edge bit map is shifted into the standing data register 74 and then through the running data register 72. Because each of the processing elements 38 will hold one present block value in standing data register 74, there will be M×N processing elements in the processing array 37.

During a computation phase, the search window pixels are shifted into the processing element array 37. Each processing element compares via an exclusive-or logic function the value of a search window pixel shifting through the processing element and the present block pixel stored in the standing data register 74. This exclusive-or value is added to the partial sums of the exclusive-or values of the obtained from the processing elements to the left and the resulting sum is shifted to the right.

Figure 5:
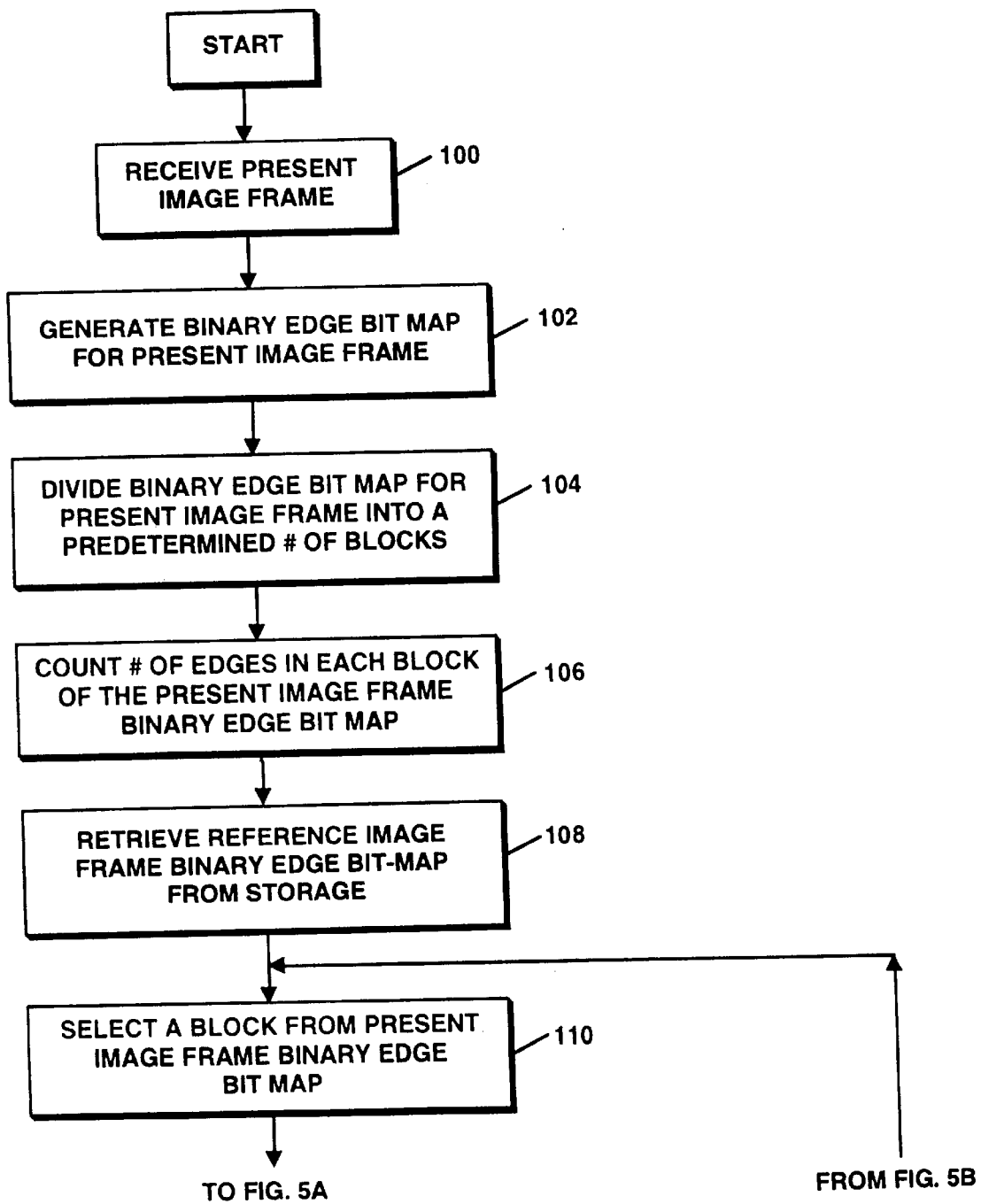
FIGS. 5–5B are a series of flow diagrams illustrating the processing steps for generating a motion vector.
Figure 5A:
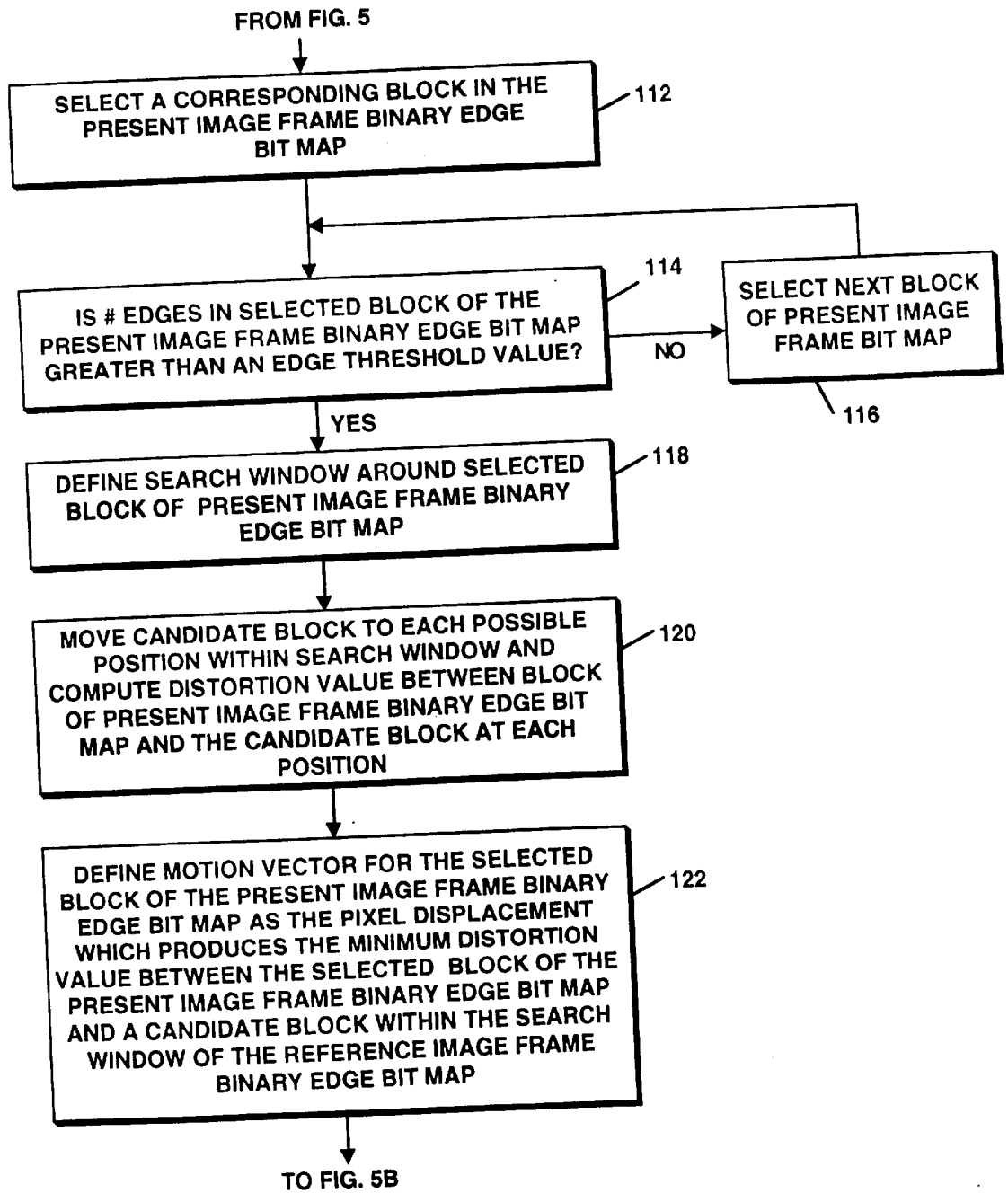
Figure 5B:
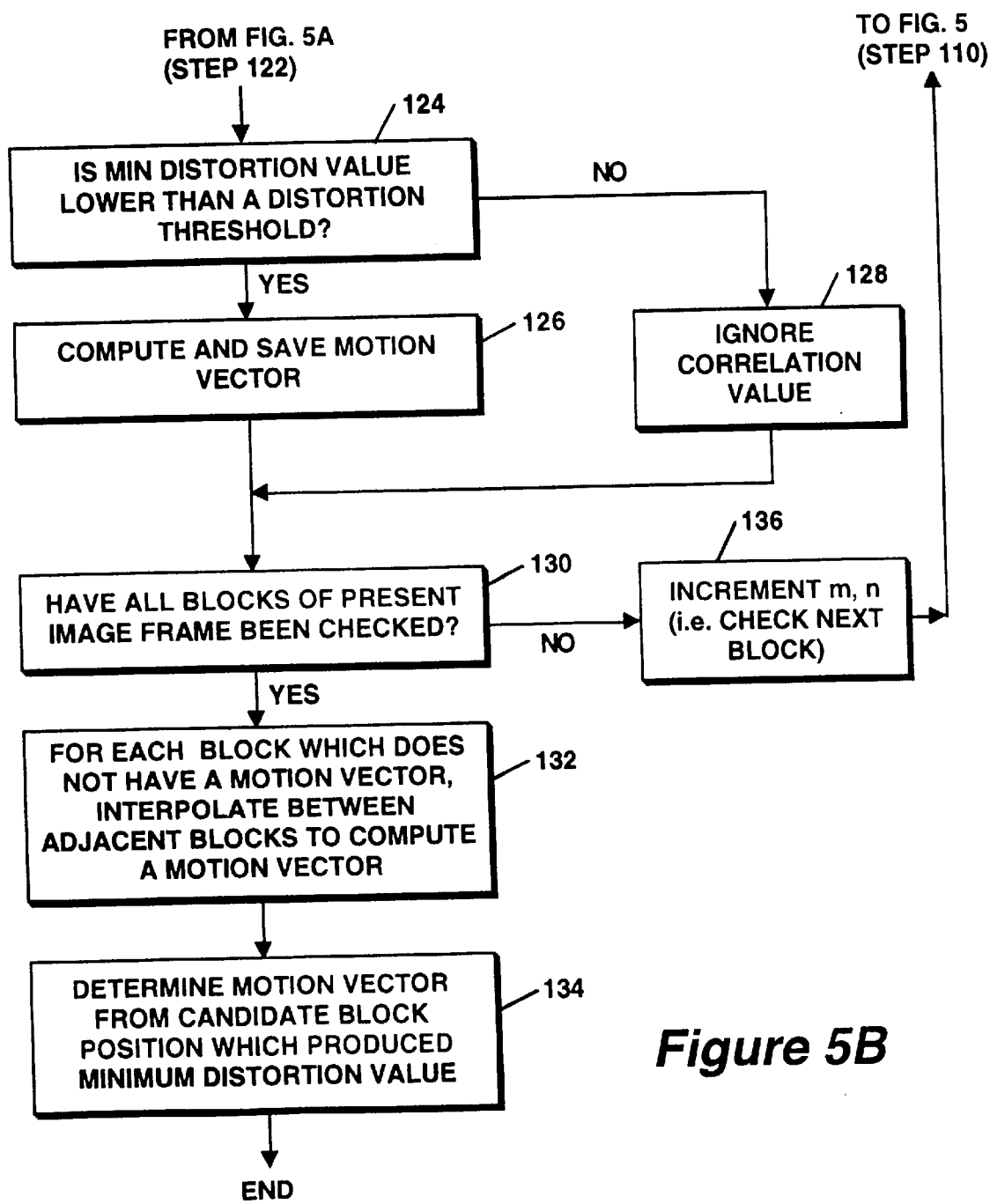

FIGS. 5–5B are a series of flow diagrams showing the processing performed in motion detector 12 to produce a motion vector. The rectangular elements (typified by element 100) herein denoted "processing steps" represent computer software instructions or groups of instructions or alternatively the processing steps represent steps performed by functionally equivalent circuits such as a digital signal processor circuit or an application specific integrated circuit (ASIC). The diamond shaped elements (typified by element 108) herein denoted "decision steps" represent instructions or groups of instructions which affect the execution of the processing steps. The flow diagram does not depict syntax or any particular computer programming language. Rather, the flow diagram illustrates the functional information one skilled in the art requires to fabricate circuits or to generate computer software to perform the processing required of motion detector 12. It should be noted that many routine program elements such as initialization of loops and variables and the use of temporary variables are not shown.

Turning now to FIG. 5, as shown in processing step 100, motion detection circuit 12 receives a present image frame in the form of a digital video signal which may be provided from a camera for example. Processing then continues to processing step 102 where a binary edge bit map is generated for the present image. The binary edge bit map may be provided using any well known technique, including but not limited to the Sobel technique, for example.

As shown in processing step 104, the binary edge bit map for the present image is divided into a predetermined number of blocks and as shown in processing step 106, the number of edges in each block of the present image binary edge bit map are counted. A reference image binary edge bit map is then retrieved from storage as shown in step 108.

It should be noted that since at least two frames are required to compute a motion vector, if the present image frame received in step 100 is an initial frame in a frame sequence, then steps 100–106 are repeated to receive a second image frame and the initial image frame becomes the reference image frame and the second image frame becomes the present image frame.

In processing step 110 a block from the present image binary bit map is selected and as shown in processing step 112 a corresponding candidate block in the reference image binary edge bit map is selected. The candidate block is positioned at a reference point in the reference frame which corresponds to the location of the block selected in the present frame.

Figures 6, 6A:
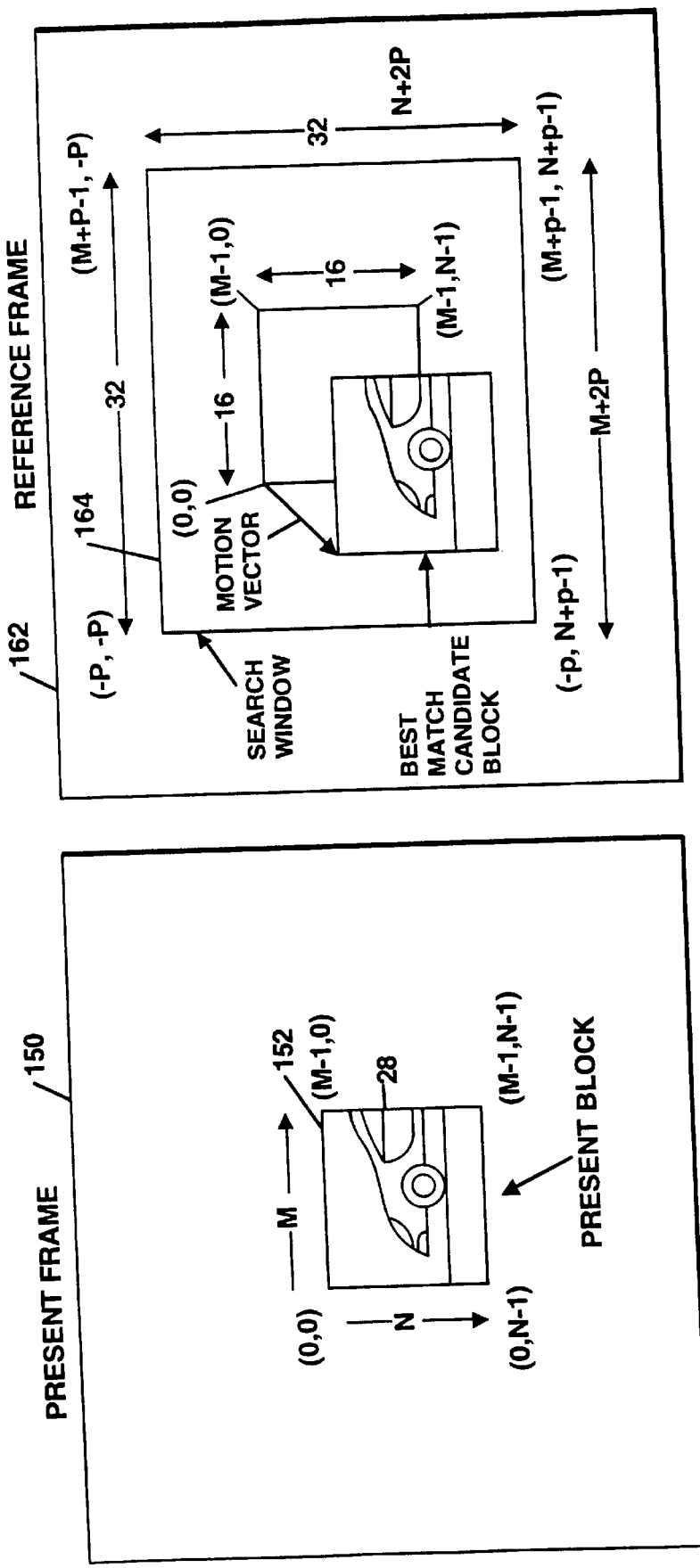
FIG. 6 illustrates a block in a present image frame.
FIG. 6A illustrates a block and a search window in a reference image frame.

Thus, referring briefly to FIGS. 6 and 6A, a present frame 150 in which a present block array (PBA) 152 has been selected is shown. Present block array 152 corresponds to an array of pixels having M columns and N rows. In the present example, M and N are both taken to be sixteen. PBA(M,N) is located at specific x, y coordinates within the present frame 150. Thus, a candidate block array (CBA) 160 in a reference frame 162 should be located at the same x, y coordinates in the reference frame as the PBA in the present frame.

Referring again to FIGS. 5–5A, decision step 114 and processing step 116 implement a loop. Decision is made in step 114 as to whether the number of edges in the selected block of the present image binary bit map is greater than an edge threshold value. Each of the bits set to a first predetermined value (e.g. 1) in the block indicate the existence of an edge in the block. Thus, the decision in step 114 is made by counting the number of bits set to the predetermined value and comparing that number to a predetermined edge threshold value.

The edge threshold value is selected in accordance with the total number of bits in the block. For example, if a block includes 256 bits (e.g. an array of pixels having 16 rows and 16 columns) then the predetermine threshold value should be set to ten. Thus, ten bits of the 256 total bits in the block must be set to the predetermined value in order to satisfy the minimum edge requirement for the block.

If the number of edges in the selected block is less than the edge threshold then processing continues to processing step 116 where the next block of the present image bit map is selected. This loop continues until a block is selected which has a number of edges which is greater than the edge threshold value. If the edge threshold value is satisfied then processing continues to processing step 118 in which a search window is defined around the selected block of the reference image bit map. As mentioned above and as shown in FIG. 6A, the position of the selected block of the reference image bit in the reference frame is identical to the location of the selected present block in the present frame.

Referring briefly to FIG. 6A, CBA 160 is shown to be an array of 16 rows by sixteen columns. A search window 164 extends an additional eight bits by eight bits past the boundaries of CBA 160 and thus the search window is 32 rows by 32 columns.

As shown in processing step 120 search window 164 moves relative candidate block 160 and a distortion value is computed between the present block and each possible position of candidate block 160 within search window 164. Processing block 122 defines a motion vector for the selected block of the present image binary edge bit map as the pixel displacement which produces the minimum distortion value between a selected block of the present image binary edge bit map and a candidate block within the search window of the reference frame.

A distortion threshold value is selected in accordance with the size of the box. For a block size of 16×16, a distortion threshold of 100 has been found to produce acceptable results. It should be noted that a 16×16 pixel array includes 256 pixels. If 100 of the pixels produce a match i.e., a distortion value of 100 then typically the motion vector for that block is valid. It should be noted that 100 corresponds to approximately 40% of the maximum distortion. Maximum distortion would be 256, indicating that no pixels are matched between the candidate block and the present block.

Decision step 124 determines whether the minimum distortion value is lower than a predetermined distortion threshold. If the minimum distortion value for the block presently under consideration is lower than the distortion threshold value then the distortion value for that block is ignored, as shown in step 128. If, however, the minimum distortion value was greater than the distortion threshold value then the motion vector is saved as shown in step 126.

Decision block 130 determines whether all the blocks in the present frame have been compared to all of the blocks in the reference frame. If all the blocks in the present frame have not been compared to the reference frame blocks, as shown in processing block 136, the next block is checked and processing returns to steps 110–124 until all of the blocks in the present frame have been compared with the reference frame blocks.

Once all of the blocks in the present frame have been processed then, as shown in processing block 132, for each block which does not have a motion vector, an interpolation is performed between adjacent blocks to compute a motion vector for the blocks which do not have motion vectors.

In step 132 any block which did not have the minimum number of edges or which did not satisfy the minimum distortion threshold value, will not be signed a motion vector. These blocks are the blocks for which a motion vector must be interpolated. Next, as shown in processing block 134, the motion vector is determined from the candidate block position which produced the minimum distortion value for the present image frame.

Referring now to FIG. 7, it should be noted that in some instances it may not be necessary to divide the image frames into fixed size blocks. In reference image 170 and present image 172, edge segments 174, 176 and 178 in reference image 170 may be correlated with edge segments 174', 176' and 178' in the present image without dividing the present image 172 into blocks.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

We claim:

1. An apparatus for estimating motion of objects between a present image frame and a reference image frame, the apparatus comprising:

an edge detector having a first input port, a second input port, a first output port and a second output port, the edge detector for receiving the present image frame at the first input port, the reference image frame at the second input port and for providing at the first output port a present image binary edge map and for providing at the second output port a reference image binary edge map; and a binary block matcher having a first input port coupled to the first output port of the edge detector, having a second input port coupled to the second output port of the edge detector and having an output port, the binary block matcher for receiving the present and reference image binary edge maps, each of the present and reference image binary edge maps having a like plurality of blocks, the binary block matcher for comparing each of the plurality of blocks of the present image binary edge map with each of the plurality of blocks of the reference image binary edge map and for generating a motion vector for each of the plurality of blocks of the present image binary edge map.

2. The apparatus of claim 1 wherein, for each of the plurality of blocks, the binary block matcher provides a corresponding current signal representative of a distortion value used to compute the motion vector.

3. The apparatus of claim 2 wherein the binary block matcher further comprises means for summing each of the current signals to provide an output current signal at the output thereof, wherein the output current signal is representative of the motion vector for the present frame.

4. The apparatus of claim 3 wherein the binary block matcher further comprises means for converting the output current signal to an output voltage at the output port of the binary block matcher.

5. The apparatus of claim 1 wherein the binary block matcher comprises a plurality of processing elements, each of the processing elements comprising:

a first register having a first input port and an output port, the first register for receiving a reference image signal on the first input port;

a second register having a first input port for receiving a present image signal and having a first output port;

a third register having a first input port coupled to the output port of the second register and having an output port, the third register for holding the present image signal fed thereto from the second register;

a current source having an output port coupled to an output port of the processing element; and means, having a first input port coupled to the output port of the first register, having a second input port coupled to the output port of the third register and having an output port coupled to the current source, said means for providing a current signal at the output port of the processing element in response to a first one of the signals from the first or third registers having a predetermined value.

6. The processing element of claim 5 wherein the means for switching comprises:

a logic circuit having a first input port coupled to the output port of the first register, having a second input port coupled to the output port of the third register and having an output port, wherein in response to a first one of the signals from the first or third registers having a predetermined value, the logic circuit provides an output signal having a first value at the output port thereof and wherein in response to the logic circuit providing the output signal having the first value at the logic circuit output port, the current source provides an output current signal at an output port of the processing element.

7. The processing element of claim 6 further comprising a switch having a first terminal coupled to the output port of the logic circuit, having a second terminal coupled to an output port of the current source and having a third terminal coupled to the output port of the processing element, wherein in response to the logic circuit providing the output signal having a first value at the output port thereof, the switch is biased into a first state and in response to the logic circuit providing the output signal having a second value at the output port thereof, the switch is biased into a second state.

8. The processing element of claim 7 wherein:

the first register is provided as a single bit register and the image signal is provided as a single bit signal;

the second register is provided as a single bit register and the reference signal is provided as a single bit signal; and the third register is provided as a single bit register and in response to a control signal, the second register transfers the single bit signal stored therein to the third register.

9. A processing element for a binary block matcher, the processing element comprising:

a first register having a first input port and an output port, the first register for receiving a reference image signal on the first input port;

a second register having a first input port for receiving a present image signal and having a first output port;

a third register having a first input port coupled to the output port of the second register and having an output port, the third register for holding the present image signal fed thereto from the second register;

a current source having an output port coupled to an output port of the processing element; and means, having a first input port coupled to the output port of the first register, having a second input port coupled to the output port of the third register and having an output port coupled to the current source, said means for providing a current signal at the output port of the processing element in response to a first one of the signals from the first or third registers having a predetermined value.

10. The processing element of claim 9 wherein the means for switching comprises:

a logic circuit having a first input port coupled to the output port of the first register, having a second input port coupled to the output port of the third register and having an output port, wherein in response to a first one of the signals from the first or third registers having a predetermined value, the logic circuit provides an output signal having a first value at the output port thereof and wherein in response to the logic circuit providing the output signal having the first value at the logic circuit output port, the current source provides an output current signal at an output port of the processing element.

11. The processing element of claim 10 further comprising a switch having a first terminal coupled to the output port of the logic circuit, having a second terminal coupled to an output port of the current source and having a third terminal coupled to the output port of the processing element, wherein in response to the logic circuit providing the output signal having a first value at the output port thereof, the switch is biased into a first state and in response to the logic circuit providing the output signal having a second value at the output port thereof, the switch is biased into a second state.

12. The processing element of claim 11 wherein:

the first register is provided as a single bit register and the image signal is provided as a single bit signal;

the second register is provided as a single bit register and the reference signal is provided as a single bit signal; and the third register is provided as a single bit register and in response to a control signal, the second register transfers the single bit signal stored therein to the third register.

13. A method of estimating motion of a moving object in a scene comprising the steps of:

(a) generating an edge bit map for each of a reference image frame and a present image frame;

(b) segmenting the reference image frame into a plurality of blocks, each of the blocks including the same number of pixels;

(c) segmenting the present image frame into a plurality of blocks, each of the blocks having including the same number of pixels;

(d) specifying the size of a search window area in the present frame;

(e) changing the relative position between a block of the present image frame and each of the plurality of blocks of the reference image frame within the search window area;

(f) computing a correlation value for each relative position of the block of the present image frame and the plurality of blocks of the reference image frame within the search window area; and (g) providing a motion vector for each block of the present image frame.

14. The method of claim 13 wherein the step of computing the correlation value includes the steps of:

combining each of the plurality of blocks of the present image binary edge bit map with a corresponding one of the plurality of blocks of the reference image binary edge bit map with exclusive OR logic;

generating an exclusive OR output signal for each of the plurality of blocks combined in the combining step; and summing the results of the combined blocks of the present image binary edge bit map and the blocks of the reference image binary edge bit map to provide an output value corresponding to the correlation value.

15. The method of claim 14 further comprising the step of comparing the computed correlation value to a threshold correlation value and wherein in response to the computed correlation value being lower than the threshold correlation value, performing the step of ignoring the correlation value and in response to the computed correlation value being greater than the threshold correlation value, performing the step of saving the correlation value.

16. An integrated circuit comprising:

a processing element array comprising a plurality of processing elements, each of the processing elements comprising:

a first register having a first input port for receiving a reference image signal and having an output port;

a second register having a first input port for receiving a present image signal and having a first output port;

a third register having a first input port coupled to the output port of the second register and having an output port, the third register for holding the present image signal fed thereto from the second register;

a current signal source having an output port coupled to an output port of the processing element; and means, having a first input port coupled to the output port of the first register, having a second input port coupled to the output port of the third register and having an output port coupled to the current signal source, said means for providing a current signal at the output port of the processing element in response to a first one of the signals from the first or third registers having a predetermined value;

a plurality of input registers coupled to a first ones of the plurality of processing elements in a first column of the processing element array;

a first plurality of processing registers coupled to second ones of the plurality of processing elements in a first row of the processing element array;

a second plurality of processing registers, coupled to third ones of the plurality of processing elements in a second row of the processing element array; and a summing circuit, having a plurality of input ports and an output port, each of the plurality of input ports coupled to a row of processing elements in said processing element array, said summing circuit for receiving a current signal from each row of processing elements and for providing a distortion signal at the output port thereof.

17. The integrated circuit of claim 16 further comprising a comparator circuit for comparing a first distortion signal provided by said summing circuit in response to a first reference image signal being stored in said first register and a second distortion signal provided by said summing circuit in response to a second reference signal being stored in said first register.

18. The integrated circuit of claim 16 wherein the first and second distortion signals are each provided as current signals.

19. The integrated circuit of claim 18 wherein said input register, said first plurality of processing registers and said second plurality of processing registers are provided having a predetermined number of memory elements wherein the number of memory elements is selected to store a number of binary bit image data values corresponding to a maximum expected shift of a present image block relative a reference point in a reference image block.

20. The integrated circuit of claim 19 wherein the means for providing an output current signal comprises a logic circuit having a first input port coupled to the output port of said first register, having a second input port coupled to the output port of said third register and having an output port, wherein:

in response to a first one of the signals from said first or third registers having a predetermined value, said logic circuit provides an output signal having a first value at the output port thereof; and in response to said logic circuit providing the output signal having the first value at the logic circuit output port, said current signal source provides an output current signal at an output port of said processing element.

* * * * *

UNITED STATES PATENT AND TRADEMARK OFFICE
CERTIFICATE OF CORRECTION

PATENT NO. : 5,838,828
DATED : November 17, 1998
INVENTOR(S) : Mizuki et al.

It is certified that error appears in the above-identified patent and that said Letters Patent is hereby corrected as shown below:

On the title page, item [75] line 2, delete "Action" and replace with --Action--.
Col. 4, line 26, delete "an" and replace with --a--.

Signed and Sealed this

Twenty-ninth Day of May, 2001

Attest:

NICHOLAS P. GODICI

*Attesting Officer*     *Acting Director of the United States Patent and Trademark Office*